Figure 1:
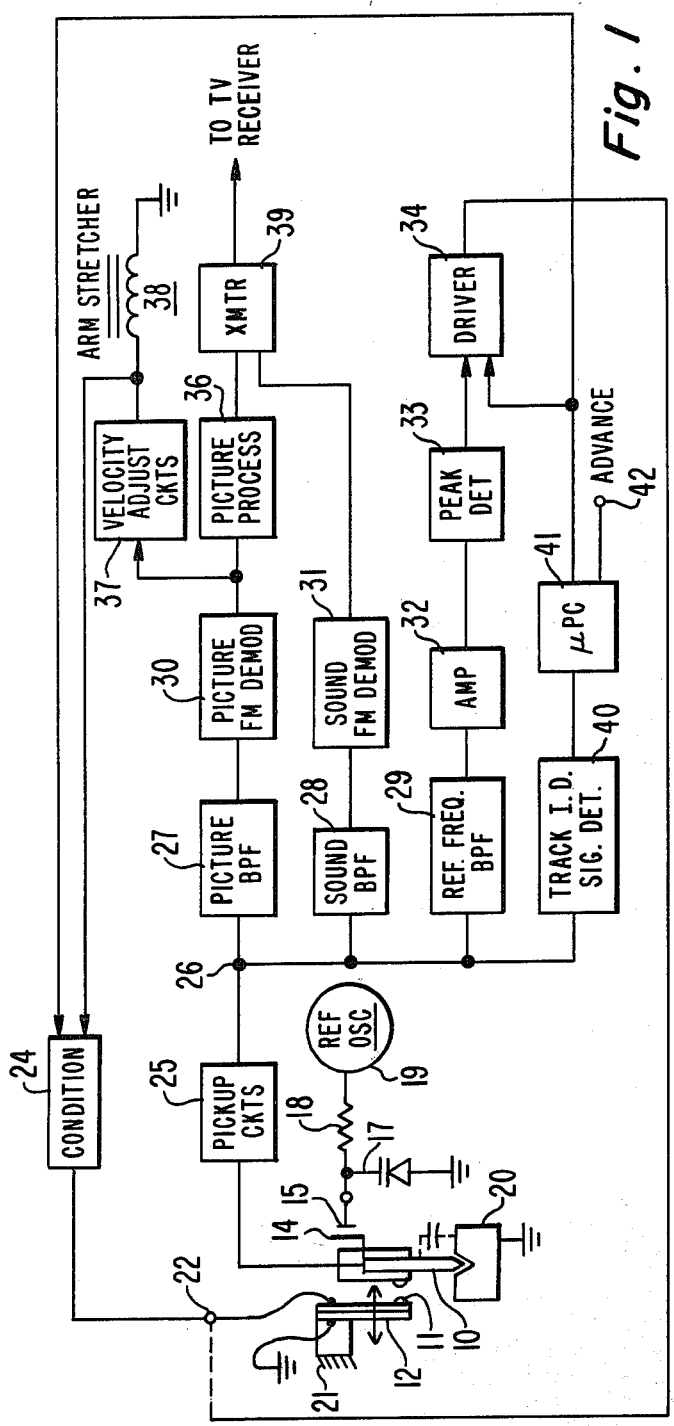

United States Patent [19]

Fukazawa et al.

[11] 4,323,998
[45] Apr. 6, 1982

[54] VIDEO DISC LOCKED GROOVE CORRECTOR

[75] Inventors: Kazuo Fukazawa; Akira Yamada, both of Tokyo, Japan

[73] Assignee: RCA Corporation, New York, N.Y.

[21] Appl. No.: 180,389

[22] Filed: Aug. 21, 1980

[51] Int. Cl.³ ............................................. G11B 21/08
[52] U.S. Cl. .................... 369/43; 369/126; 369/256; 369/221
[58] Field of Search ................... 358/128.5, 128.6; 360/77, 10, 72.2; 318/662; 324/61 QS; 369/43, 50, 126, 256, 129, 215, 170, 244, 220, 221, 226, 228

[56] References Cited

U.S. PATENT DOCUMENTS

| | | | |
|---|---|---|---|
| 3,711,641 | 1/1973 | Palmer | 358/128.6 |
| 3,873,763 | 3/1975 | Janssen | 369/45 |
| 3,952,145 | 4/1976 | Allen | 369/256 |
| 3,961,131 | 6/1976 | Taylor | 369/219 |
| 3,963,860 | 6/1976 | Burrus | 358/128.6 |
| 3,963,861 | 6/1976 | Crooks | 369/43 |
| 3,965,482 | 6/1976 | Burrus | 358/128.6 |
| 3,973,080 | 8/1976 | Dickopp | 358/128.5 |
| 3,993,863 | 11/1976 | Leedom | 358/128.5 |
| 4,030,123 | 6/1977 | Taylor | 369/253 |
| 4,149,199 | 4/1979 | Chick | 360/77 |
| 4,152,727 | 5/1979 | Tatsuguchi | 369/43 |
| 4,164,756 | 8/1979 | Toda | 358/128.6 |
| 4,176,378 | 11/1979 | Toda | 360/10 |
| 4,183,059 | 1/1980 | Palmer | 360/10 |
| 4,183,060 | 1/1980 | Barnette | 318/662 |
| 4,247,741 | 1/1981 | Tatsuguchi | 360/77 |

FOREIGN PATENT DOCUMENTS 2022901 12/1979 United Kingdom ............... 360/77

*Primary Examiner*—Vincent P. Canney
*Assistant Examiner*—Alan Faber
*Attorney, Agent, or Firm*—E. M. Whitacre; J. S. Tripoli; E. P. Herrmann

[57] ABSTRACT

A video disc player having an adaptive bumper apparatus which tracks the signal pickup stylus to maintain a fixed spatial relation therebetween. The bumper is fixed to an electromechanical transducer secured to the stylus arm support carriage. Signals correlated to the relative disc-stylus velocity having frequency components of the once around rate of the disc are adapted to energize the transducer to cause the bumper to follow the motion of the stylus in the radial dimension. Disturbing visual effects resulting from disc defects, etc. which tend to kick the signal pickup stylus fore or aft of the current track position are significantly reduced.

15 Claims, 6 Drawing Figures

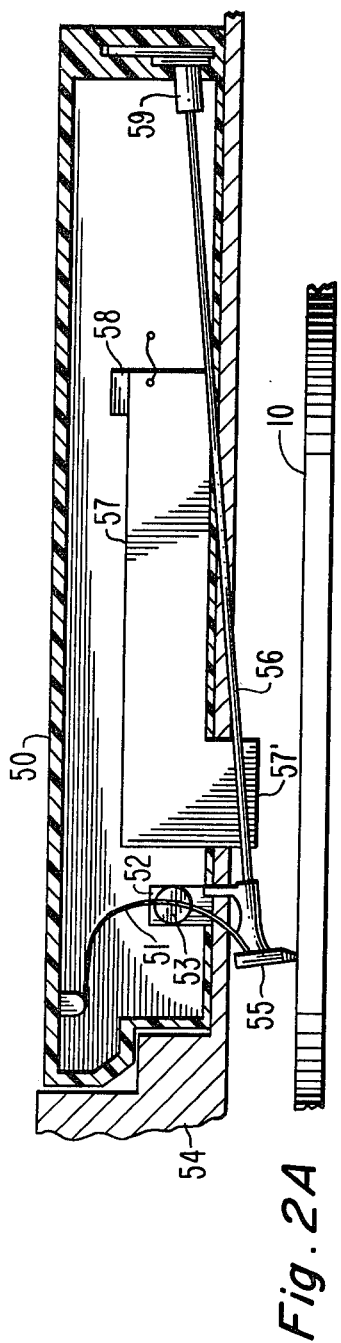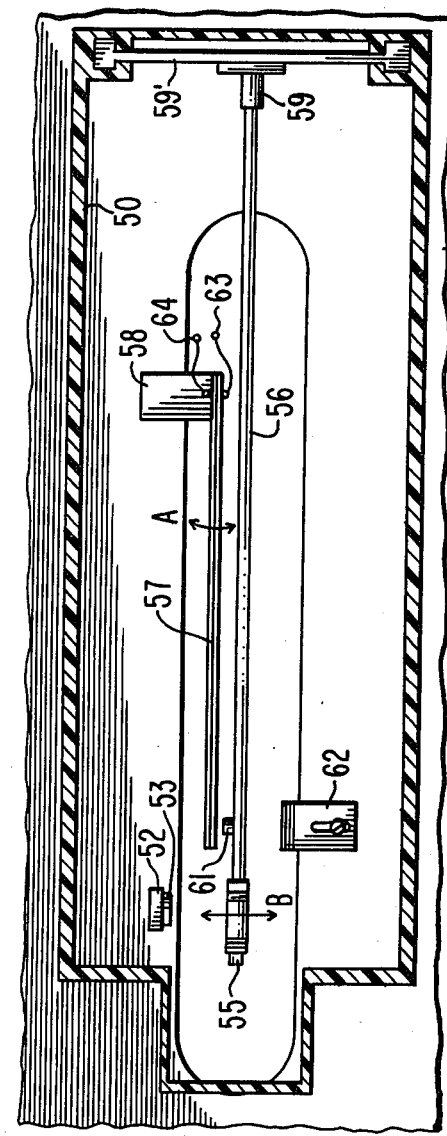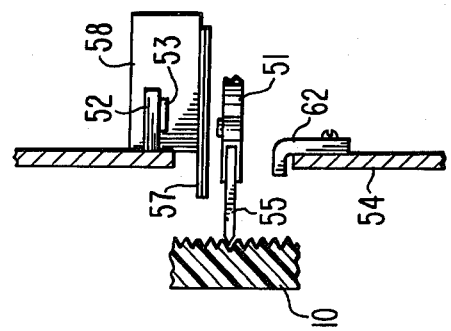

VIDEO DISC LOCKED GROOVE CORRECTOR

This invention relates to video disc record player systems and in particular to apparatus for urging the signal pickup stylus out of a locked groove condition.

In high density video disc recording systems, video information is recorded by means of geometric variations in information tracks on the surface of a disc record. In capacitive type video disc systems, the record typically comprises conductive material combined with a thin layer of dielectric material disposed on the surface of the disc, which dielectric may comprise simply a lubricating medium. A pickup stylus, supported at one end of a stylus arm, engages the information track and includes a conductive electrode which establishes a capacitance with the conductive disc material and the dielectric layer. When the record is rotated to establish relative velocity between the information tracks on the disc record and the pickup stylus, the stylus/disc capacitance varies in accordance with the geometric variations in the information track. The capacitance variations are converted to electrical signal variations by suitable signal processing circuitry coupled to the stylus electrode. This recovered and processed signal may be coupled to a conventional television receiver for reproduction of the recorded information. (Note the recorded information on a video disc record typically includes picture information including chroma bursts, sound accompaniment information and the standard TV synchronizing signals.)

In general there are two types of disc records for operation with capacitance pickup systems; grooved and grooveless. In the grooved disc records the information-tracks are coincident with the groove and the geometric variations are impressed either in the bottom of the groove or the groove walls or both. The pickup stylus is configured to engage and track the groove. In the grooveless system the surface of the record is smooth. The stylus is caused to follow the information track by a servo system responsive to tracking signals included within the information tracks, or in tracks adjacent to the information tracks.

The pitch between the information tracks in both the grooved and grooveless is typically extremely small, e.g., a few micrometers. As a practical result, regarding the grooved system, the groove depth is relatively shallow, too shallow to reliably provide sufficient radial forces to impart radial translatory motion to the pickup stylus support structure across the record. Therefore the stylus is mounted in a carriage which is driven either at a uniform rate synchronized with the rotation of the record, or at a rate determined by a particular parameter sensed in a carriage servo drive mechanism.

A further consequence of the high information-density and small track pitch is that the geometric variations defining the recording are individually extremely small producing extremely small capacitance changes. To recover the information without appreciable cross talk the pickup stylus must be physically small and either contacting the disc record or substantially contacting the disc record. This renders the stylus susceptible of being easily diverted from its normal progression along a track by very small material defects on the disc, i.e., either foreign particulate matter which has settled and adhered to the disc or imperfections produced during manufacture. Defects which tend to bump or throw the stylus outward several tracks causing replay, or a number of consecutive replays of the same information (termed locked grooves) produce particularly disturbing visual effects on the viewing screen. The locked groove condition may occur in the grooved system as described above, as well as in the grooveless system. In the grooveless system debris on the record surface or defects in the tracking signals may cause the pickup to replay the same information tracks over and over again. Various methods have been developed to reduce the effects of locked grooves including adding "bumpers" to the carriage mechanism to push the stylus past the defect, or, means to selectively impart a "kick" to the stylus arm to translate the stylus past the defect, see for example U.S. Pat. No. 3,961,131, issued to B. K. Taylor, entitled "Disc Record Locked Groove Escape Apparatus", U.S. Pat. No. 3,963,860, issued to T. W. Burrus, entitled "Locked Groove Detection and Correction In Video Disc Playback Apparatus", or U.S. Pat. No. 4,183,059, issued to to R. C. Palmer, entitled "Track Skipper For Video Disc Player" for examples.

Fixed bumper systems do not always satisfactorily correct for locked grooves. Information tracks are typically eccentric to the axis of rotation. Due to the track eccentricity, the stylus arms are compliantly mounted to the carriage assembly to permit the stylus to track inward and outward with each rotation to follow the eccentricity. The bumper must be spaced away from the stylus/stylus arm to at least permit the radial stylus translation due to the eccentricity, which distance may correspond to as many as 40 tracks. Thus for a given record with very little eccentricity, played on a player having bumpers arranged to account for the maximum allowable eccentricity, a stylus may be translated outward by a defect a significant number of tracks and yet still not be particularly close to the bumper for immediate engagement therewith.

The present invention reduces the effects of locked grooves by providing a carriage mounted bumper which actively tracks the position of the stylus. As such the bumper is maintained very close to the stylus or continuously in contact therewith so that a locked groove or defect can only throw the stylus a predetermined maximum number of groove convolutions outward. Depending on the distance established between the stylus/stylus arm and the tracking bumper determines the time interval of replay or the time required before the stylus/stylus arm is engaged by the bumper and urged past the defect.

In accordance with the present invention a stylus following bumper translated via a transducer is mounted on the carriage assembly. The bumper is arranged proximate the stylus/stylus arm and moves responsive to control signals applied to the transducer to maintain a substantially constant relationship between bumper and stylus/stylus arm, thereby determining the maximum distance the stylus can be radially translated in an outward or away from record center direction. Control signals to drive the transducer are derived from the stylus velocity adjusting electronics.

Figure 4:
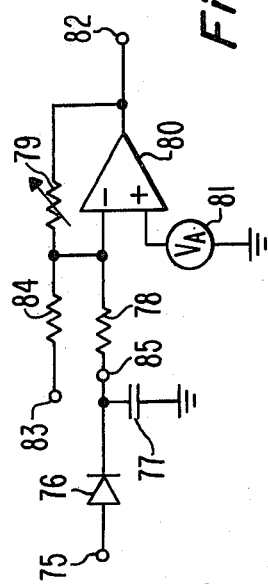
Figure 3:
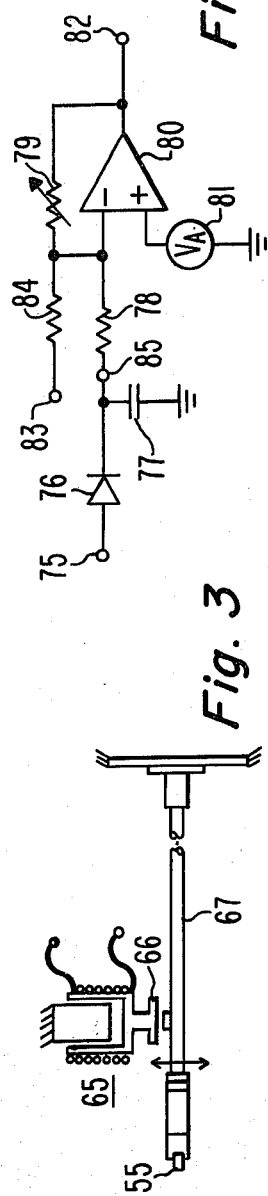

In the drawings:

FIG. 1 is a block diagram of a video disc player incorporating a movable stylus/stylus arm bumper;

FIGS. 2A, B and C are side, top and end views of a movable bumper arrangement incorporating a bimorph transducer;

FIG. 3 is a schematic diagram of an alternate moveable stylus/stylus arm bumper; and FIG. 4 is a schematic diagram of circuitry for an adaptive fixed bumper system.

Referring to FIG. 1 a signal pickup stylus 10 engages disc record 20 having a grooved information track. Pickup circuits 25, connected via connection 23 to pickup stylus 10, detect changes in stylus-record capacitance which varies in accordance with geometric changes in the track and produces an electrical manifestation of the recorded signal at connection 26. This signal manisfestation is applied to the picture bandpass filter 27 which selectively extracts the picture and synchronizing components of the recovered signal. The output signal from filter 27, typically a frequency modulated, or FM, signal is demodulated by circuit 30 to baseband video signals and is processed into standard video format, e.g., NTSC, PAL, etc. by processing circuitry 36. The recovered signal at connection 26 is also applied to the sound bandpass filter 28 which selectively extracts the modulated sound carriers from the recovered signals. The sound carrier is demodulated to baseband audio in the sound demodulator 31. The demodulated video and audio signals are applied to transmitter 39 which conditions the signal for delivery to a conventional television receiver.

Eccentricity of the information tracks with respect to the axis of disc rotation creates variations in the relative disc-stylus velocity because a given track has a different radial dimension for different angular locations. This velocity variation is compensated by imparting motion to the stylus in a direction along the track, i.e. where the track radius is shortest the stylus is caused to move along the track, opposing the relative tangential track-stylus arm motion due to the disc rotation to increase the relative stylus disc velocity and where the track radius is longest the stylus is caused to move along the track in the same direction as the relative tangential track-stylus arm motion due to disc rotation to decrease the relative stylus-disc velocity. The velocity correction is performed by a transducer (armstretcher 38) which couples longitudinal motion to the stylus arm 40 responsive to a velocity correction signal generated in circuitry 37. The velocity adjusting signal is typically derived by comparing the phase angle of the color burst signal component of the recovered video signal against a stable reference frequency. The phase error between the two signals is filtered to extract the phase error components which coincide with the disc rotation rate, and this signal is used to drive the armstretcher, see U.S. Pat. No. 3,965,482, issued to T. W. Burrus, entitled "Velocity Correction Circuit For Video Discs" or for an alternative method of deriving a velocity adjusting signal using the horizontal sync component of the recovered signal see U.S. Pat. No. 3,711,641, issued to R. C. Palmer, entitled "Velocity Adjusting System".

Since the armstretcher drive signal is primarily related to track eccentricity, the present inventors realized that it could be used to modulate the position of a stylus bumper or "stonewall" for maintaining forward radial motion of the pickyp stylus over disc defects or locked grooves with a reduced response time. The velocity correction signal corresponds to the radial position of the stylus, therefore applying this signal, or at least the frequency components thereof corresponding to the disc rotation rate, to a transducer 12 arranged to impart radial motion to a bumper 11 located adjacent to the stylus/stylus arm, provides a means of maintaining the stylus/stylus arm and bumper in a substantially fixed spatial relationship. The spatial distance between the stylus/stylus arm 10 and the bumper is predetermined in consonance with the desired response time of the bumper system. The armstretcher signal is applied to circuitry 24 which conditions the signal for application to the input terminal 22 of the piezoelectric bumper transducer 12.

Circuitry 24 might be an attenuator or a simple amplifier, or voltage to current converter or other device depending on the type of transducers employed to perform the velocity correction and bumper modulation. For example, if both transducers are current drive devices, circuitry 24 would be a simple buffer current amplifier designed to provide sufficient drive current to the bumper transducer without drawing significant drive current away from the armstretcher. Alternatively, if both transducers are voltage drive devices, with the armstretcher requiring a greater voltage modulation than the bumper transducer, circuitry 24 would be a simple resistor divider.

The player apparatus of FIG. 1 includes an alternate system for providing a bumper tracking signal (for illustrative purposes). The alternate tracking system includes reference oscillator 19 which injects a constant frequency signal into the recovered signal path via resistor 18, varactor diode 17 and a position sensitive capacitor having a first capacitor plate 15 secured to the carriage assembly 21 and a second capacitor plate 14 arranged to move substantially in conformance with the motion of the stylus arm. The amplitude of the injected reference frequency signal available at connection 26 is inversely proportional to the spatial separation of capacitor plates 14 and 15 and thereby is indicative of the relative changes of position of the stylus with respect to the carriage. The reference frequency is separated from the recovered signal by the reference bandpass filter 29, amplified in amplifier 32 and envelope or peak detected in circuit 33. The envelope is applied to driver 34 which conditions the signal to energize the particular bumper transducer. Note that for the arrangement shown the position sensitive capacitance will produce a non-linear signal due to its inverse signal generation characteristic, and driver 34 would be arranged to provide compensation for this inverse relationship.

A further system incorporated in the FIG. 1 player monitors the forward progression of the stylus, and upon detecting an anomalous retrogression generates a pulse to cause the buffer transducer to bump the stylus forward an appropriate displacement. The illustrative sytem including circuits 40 and 41 is premised upon track identification signals being recorded on the record along with the video information as for example by including digital track code numbers in the vertical blanking intervals. In FIG. 1, circuit 40 is designed to recognize the track identification information in the recovered signal which may be accomplished by using a two part code, the first part being a recognition code to alert (via matched filter techniques) the circuit 40 that a certain portion of the recovered signal immediately preceding or following the recognition code is a track number (the second part of the code). The second part of the code is then conditioned to conventional digital format and applied to the microprocessor 41 which is programmed to recognize an abnormal sequence of track numbers and to generate an appropriate output "kick" pulse to advance the stylus.

The output signal (e.g., pulses from microprocessor 41) is applied to conditioning circuit 24 or driver 34 to generate the appropriate wave shape and amplitude signal for causing the bumper transducer to selectively impart a generally impulsive kick or skip to the stylus. The kick signal is superimposed onto the tracking signal for application to the transducer.

For alternate modes of locked groove detection and correction see U.S. Pat. No. 3,963,860, issued to T. W. Burrus, entitled "Locked Groove Detection and Correction In Video Disc Playback Apparatus" and U.S. Pat. No. 4,183,059, issued to R. C. Palmer, entitled "Track Skipper For A Video Disc Player".

Note that a fast forward scan feature can be added to the system simply by programming the microprocessor to output a predetermined sequence of pulses upon application of an "advance" signal at terminal 42. A fast or slow reverse scan can be implemented by including a second tracking bumper on the opposite or forward side of the stylus arm and appropriately programming the microprocessor. The combining of the track following bumper and "kick" feature provides generally uniform and predictable "kick" performance due to the "kicker" i.e. the bumper, and the stylus/stylus arm being substantially in a constant spatial relationship.

FIG. 2 illustrates a particular bumper transducer system employing a piezoelectric transducer (bimorph). In the FIG. 2 drawings a cartridge enclosure 50 removably mounted in the carriage assembly 54, contains a stylus arm assembly 56 having a first end compliantly secured to the cartridge by complaint coupler 59 and 59'. A signal pickup stylus 55 secured to the second end of stylus arm 56 engages disc record 10 and is conductively coupled to signal pickup circuitry by flylead 51. A position sensitive capacitance is formed by a first electrode (plate) 53 mounted on support 52 with the portion of the edge of the flylead 51 adjacent electrode 53 providing the second capacitor plate. The support 52 may be integral to the cartridge or secured directly to the carriage. An adjustable fixed bumper 62 is secured to the carriage 54 to limit the forward excursion of the stylus with respect to the carriage.

A generally longitudinal piezoelectric transducer 57 secured to support 58 is arranged generally parallel to and proximate the stylus arm 61. The transducer has an extension 57' configured for engaging the stylus arm to limit the extent of backward stylus translation due to locked grooves or defects. Extension 57' may be integral to the transducer 57 or a separate element secured thereto. Note the stylus arm may be equipped with a lateral element 61 or a vertical element (not shown) for engaging the bumper to simplify positioning constraints of the system. The support member 58 may be an integral part of the cartridge 50 or secured directly to the carriage assembly 54.

The transducer 57 is of the type which will produce relative bending between its ends when a potenital is applied between its input terminals 63 and 64. Since one end of the transducer is secured in fixed relation to the carriage the structure will bend in the direction indicated by the arrow designated A in FIG. 2B. The track eccentricity will cause the stylus arm to move relative to the carriage in the direction of the arrow designated B. Thus is can be appreciated that by applying the appropriate time varying potential to the terminals 63 and 64, the bumper transducer 57 can be maintained in a substantially fixed spatial relationship with the stylus arm assembly 56 (at least with respect to element 61). That is, the present system causes the transducer 57 to move in synchronism with the motion of stylus arm 56 during playback. A more comprehensive description of a suitable piezoelectric transducer may be found in U.S. Pat. No. 4,164,756, issued to M. Toda et al, entitled "Disc Record Groove Skipper".

If the bumper transducer 57 or the extension 57' thereof is formed of a resilient and flexible polymer material such as polyvinylidene flouride ($PVF_2$), the transducer may be arranged in direct contact with the stylus arm 56 at element 61. The flexibility of the transducer provides for small relative differences in the normal radial travel between the transducer and the stylus arm. Thus, relative to the arrangement shown in FIG. 2B, if the stylus arm is contacting a flexible transducer 57, and the stylus, faithfully tracking the record groove moved leftward by an amount greater than the transducer would have moved because the transducer driving potential was imperfectly correlated to the stylus motion, the transducer would elastically yield an amount sufficient to compensate for the difference. The transducer, however, is designed to have sufficient stiffness to perform as a bumper or skipper, the resiliency therein providing additional design flexibility.

An alternative simplified system is a passive flexible bumper, e.g., $PVF_2$, arranged similarly to the transducer 57 in FIG. 2, to improve play performance over a system having fixed rigid bumpers. Such a system is obtained by leaving terminals 63 and 64 disconnected. Minor record defects which are narrowly sufficient to interrupt normal stylus progression by disengaging the stylus from the information track would be precluded from doing so by such a flexible bumper applying a small counteractive force to the stylus arm in the direction of normal play sequence. The bumper would be sufficiently elastic to yield to the normal stylus lateral excursions due to track eccentricity, yet resistive to additional impulsive forces due to disc surface defects or accumulated foreign matter residing on the disc.

FIG. 3 illustrates an alternative bumper transducer employing either a solenoid or a speaker coil 65 with a bumper element 66 secured thereto and arranged proximate the stylus arm 67.

A further mode of system operation is to employ adaptive fixed bumpers. In this type of system the bumper does not track the stylus but is positioned, via a transducer, a fixed distance from the relaxed position of the stylus arm. The bumper-stylus arm separation is established inversely proportional to the amplitude of the velocity adjusting signal. Note that a large velocity adjusting signal indicates that there is appreciable track eccentricity and therefor relatively large deviation of the stylus arm from its nominal relaxed position. The bumper must therefor be positioned relatively distant from the centered or relaxed position of the stylus arm to the extent that the stylus arm will not engage the bumper when the stylus is tracking the information track at its maximum radius vis-a-vis the eccentricity. Conversely, a disc record having an information track which exhibits little or no eccentricity will produce relatively small velocity adjusting signals and the stylus will deviate only slightly with respect to its centered or relaxed condition. In this case the bumper is positioned relatively close to the relaxed position of the stylus.

FIG. 4 illustrates circuitry to generate transducer control signals to perform the above-described adaptive fixed bumper function. The armstretcher or velocity adjusting signal is applied to terminal 75. The amplitude of this signal is peak detected by the diode 76-capacitor 77 combination and applied via resistor 78 to the inverting input of differential amplifier 80. The potential of the detected signal is translated to output terminal 82, for application to the transducer, modified by a gain factor of (−) R79/R78, where R79 is the resistance of feedback resistor 79, and R78 is the resistance of resistor 78. A reference voltage 81 is applied to the noninverting input terminal of amplifier 80 to establish the appropriate quiescent output potential. A second input terminal 83 is provided for application of a "kick" pulse to selectively urge the stylus arm radially forward. The "kick" pulse is translated to output terminal 82 modified by a gain factor of (−) R79/R84, where R84 is the resistance of resistor 84. Note that by removing the peak detector diode 76, and applying the armstretcher voltage directly to terminal 85, the output potential thereof will cause the bumper to track the stylus arm and the "kick" pulses are essentially superimposed onto the tracking signal.

What is claimed is:

1. In a video disc player in which a signal pickup stylus cooperates with a disc record for recovering signals recorded in information bearing tracks during playback, said disc being subject to rotation to create relative velocity between the pickup stylus and the disc record, said information bearing tracks tending to be eccentric to the axis of rotation of said disc, and said disc being subject to having physical defects tending to disengage the pickup stylus from said tracks and to interfere with the normal progression of the signal pickup stylus across the record, apparatus for translating the signal pickup stylus radially across said disc comprising:

a carriage;
   a stylus arm having said signal pickup stylus fixed at a first end, and having a second end;
   means for securing the second end of the stylus arm to said carriage, the first end of the stylus arm being free to move relative to said carriage;
   a longitudinal flexible member having a first end secured to said carriage at a point separate and distinct from said stylus arm and having a second end arranged proximate the first end of the stylus arm, said flexible member yieldably engaging the stylus arm during normal progression of the signal pickup stylus across the disc record and resisting disengagement of the pickup stylus from said information tracks due to disc defects.

2. The video disc player set forth in claim 1 wherein the flexible member is a polymer piezoelectric transducer having input terminals for applying a control signal to position the second end of said member in a desired spatial relation to the first end of the stylus arm.

3. In a video disc player in which a signal pickup stylus cooperates with a disc record for recovering signals recorded in information bearing tracks during playback, said disc being subject to rotation to create relative velocity between the pickup stylus and the disc record, said information bearing tracks tending to be eccentric to the axis of rotation of said disc, and said disc being subject to having physical defects tending to disengage the pickup stylus from said tracks and interfere with the normal progression of the signal pickup stylus across the record, apparatus for translating the signal pickup stylus radially across said disc comprising:

a carriage;
   a stylus arm having said signal pickup stylus fixed at a first end, and having a second end;
   means for securing the second end of the stylus arm to said carriage, the first end of the stylus arm being free to move relative to said carriage;
   an electromechanical transducer secured in fixed relation to said carriage at a point separate and distinct from said stylus arm and responsive to a control signal for causing an element of said transducer to follow the stylus arm motion in a substantially radial direction relative to the disc to maintain a substantially fixed spatial relationship between said stylus arm and said element and to urge the stylus radially across the disc upon having its radial progress interrupted by a disc defect, or to produce special playback effects.

4. The video disc player set forth in claim 3 wherein the stylus arm is compliantly secured in a cartridge enclosure removably mounted in said carriage.

5. The video disc player set forth in claim 3 wherein both the stylus arm and the electromechanical transducer are mounted in a cartridge enclosure which is removably mounted in said carriage.

6. The video disc player set forth in claim 3 wherein the transducer comprises a bimorph having a generally longitudinal configuration arranged substantially parallel to the longitudinal axis of the stylus arm, a first end of said bimorph being in fixed relation to the carriage and a second free end located proximate the first end of said stylus arm so that application of said control signal to said bimorph will cause the second end of the bimorph to bend generally toward or away from said stylus arm and including means for engaging the stylus arm for imparting motion thereto radially across the disc record.

7. The video disc player set forth in claim 6 wherein the bimorph comprises a polymer material, the structure being sufficiently flexible to yield a limited distance radially with respect to said disc record when the stylus arm engages said transducer.

8. The video disc player set forth in claims 2, 3, 4, 5, 6, or 7 further including means for generating said control signal.

9. The video disc player set forth in claim 8 wherein the means for generating the control signal comprises a further transducer secured in fixed relation to said carriage at a point separate and distinct from said stylus arm and cooperating with the stylus arm for determining the relative distance therebetween and thereby the relative change of position of the stylus arm with respect to the carriage.

10. The video disc player set forth in claim 9 wherein the further transducer comprises:

a capacitor having a first plate fixed to the carriage and a second plate mounted to move in general conformance with the motion of the signal pickup stylus during playback;
   means for applying an AC signal to the first capacitor plate;
   means for sensing the AC signal coupled to said second plate; and
   means for detecting the sensed AC signal and conditioning said detected signal to control said electromechanical transducer.

11. The video disc player set forth in claim 8 including a means for generating a control pulse, said control pulse being superimposed on said control signal for selectively imparting momentary excursions to said transducer to engage and radially translate the stylus arm a predetermined distance.

12. The video disc record player set forth in claim 8 wherein means for generating the control signal comprises:
  pickup circuitry cooperating with the signal pickup stylus for recovering the signal prerecorded on the disc record;
  means responsive to the recovered signal for developing a correction signal when the tangential velocity of said disc record relative to said signal pickup stylus deviates from a predetermined relative velocity; and
  means responsive to said correction signal for conditioning said correction signal to energize the electromechanical transducer to follow motion of the stylus arm relative to the carriage in a direction radially across the disc.

13. The video disc player set forth in claim 12 wherein the means responsive to said correction signal is an amplifier arranged to condition correction signals resulting from relative velocity which is slow relative to the predetermined relative velocity to provide a control signal for moving the transducer element in a direction radially inward toward the center of the disc record and to condition correction signals resulting from relative velocity which is fast relative to said predetermined relative velocity to provide a control signal for moving the transducer element in a direction radially outward from the disc record center.

14. The video disc player set forth in claim 12 further including:
  means for generating a pulse of predetermined duration and amplitude; and
  means for superimposing said pulse on the control signal for selectively imparting a controlled translation to the transducer for engaging the stylus arm and urging it radially inward over a desired number of information tracks.

15. The video disc player set forth in claim 13 further including a peak detector having an input terminal connected to receive said correction signal and an output terminal connected to an input terminal of said amplifier.

* * * * *